United States Patent [19]

Williams

[11] Patent Number: 5,560,835

[45] Date of Patent: Oct. 1, 1996

[54] PLEATED BELT FILTER WITH SUCTION MEANS TO REMOVE DEBRIS

[75] Inventor: Roger D. Williams, Dallas, N.C.

[73] Assignee: Pneumafil Corporation, Charlotte, N.C.

[21] Appl. No.: 500,572

[22] Filed: Jul. 11, 1995

[51] Int. Cl.$^6$ .................................................. B01D 33/048
[52] U.S. Cl. ........................... 210/783; 210/791; 210/391; 210/400; 210/407; 55/290; 55/302; 55/354; 55/400; 95/277; 95/278
[58] Field of Search .................................. 210/400, 791, 210/401, 387, 783, 493.1, 493.2, 407, 409, 416.1, 391; 55/290, 301, 302, 354, 400, 467; 95/277, 278

[56] References Cited

U.S. PATENT DOCUMENTS

| | | | |
|---|---|---|---|
| 2,335,144 | 11/1943 | Dahlman | 55/354 |
| 2,463,723 | 3/1949 | Spraragen | 55/354 |
| 4,187,091 | 2/1980 | Durr et al. | 210/493.1 |
| 4,725,292 | 2/1988 | Williams . | |
| 4,772,398 | 9/1988 | Sando et al. | 210/400 |
| 4,842,749 | 6/1989 | Cox | 210/400 |
| 4,875,913 | 10/1989 | Barzuza | 55/521 |
| 5,346,519 | 9/1994 | Williams | 55/489 |

FOREIGN PATENT DOCUMENTS

| | | | |
|---|---|---|---|
| 2544219 | 10/1984 | France | 210/400 |
| 654306 | 6/1963 | Italy | 210/400 |
| 304964 | 5/1972 | U.S.S.R. | 55/354 |
| 743876 | 1/1956 | United Kingdom | 55/354 |

Primary Examiner—Robert J. Popovics
Attorney, Agent, or Firm—Shefte, Pinckney & Sawyer

[57] ABSTRACT

A self-cleaning filter apparatus for use in removing particulate matter from a transport fluid, such as air, which includes a housing having a pair of spaced pulleys over which an endless filter belt is positioned to present two generally straight filter reaches and two generally curved filter reaches. The endless filter belt includes a permeable substrate formed as an endless belt and a plurality of pleats of filter media extending outwardly from the surface of the substrate so that the transport fluid can pass inwardly therethrough an deposit the particulate material on the exterior surface of the pleats. A suction nozzle is positioned adjacent the outer surface of the endless filter at one of the curved reaches thereof for removing particulate matter deposited on the pleats as they pass along such curved reach.

14 Claims, 7 Drawing Sheets

PLEATED BELT FILTER WITH SUCTION MEANS TO REMOVE DEBRIS

BACKGROUND OF THE INVENTION

This invention relates generally to filters and dust collectors and, more particularly, to apparatus of this general type which includes some arrangement for automatically cleaning the filter media continuously or at periodic intervals.

There are many types of filters and dust collectors which include some form of filter media through which transport air or other fluid having dust or other foreign matter is entrained therein passed to deposit the foreign matter on the exposed surface of the filter media, and in industrial and similar heavy-duty applications where the filtered foreign matter collects on the surface of the filter media at a relatively rapid rate. It is desirable to provide the apparatus with some form of automatic cleaning of the filter media so that it can be run on a continuous basis.

For example, the typical industrial bag-type filter includes some form of reverse air flow, or "backwashing," of cleaning air opposite to the normal flow of the transport air which lifts the foreign matter collected on the exposed surface of the bag off of the bag so that it can gradually migrate downwardly to the bottom of the filter apparatus where it can be collected and removed. Similarly, in typical pleated paper filters, a high pressure pulse of cleaning air is passed back through pleated paper filter cartridges to move the foreign matter away from the surface of the filter media. In cleaning arrangements of this type, the efficiency of the cleaning is reduced by the fact that the foreign matter, when it is temporarily moved away from the surface of the filter, is not immediately transported away from the filter, but is instead allowed to sometimes be re-entrained in the transport air and brought back to tire surface of the filter, albeit at a different (e.g., lower) location on the filter.

In other types of filters, belts or substrates of filter media are used, and because of the nature of such filter media it is possible to use a suction nozzle positioned adjacent the surface of the substrate for removing the collected foreign or particulate matter therefrom and then using the suction to transport the foreign or particulate matter away from the filter for collection and removal. In some filters of this type, the flat filter is stationary and the cleaning nozzle is moved across the surface of the filter media as disclosed, for example in Williams U.S. Pat. No. 4,725,292, and in other designs the filter media is moved past a stationary suction nozzle. While the efficiency of the cleaning apparatus in these filters is very high since the foreign matter is positively removed from the filter media and carried away, the filtering efficiency of the filter apparatus itself is relatively small because the filter media is in a flat or planar form which, for a given size of filter apparatus, offers a relatively low air-to-cloth ratio as compared, for example, with the above-described pleated paper filters.

In accordance with the present invention, a unique filtering apparatus and method are provided which combines the high cleaning efficiency of belt-type filters with the high filtering efficiency of filters having a pleated filter media.

SUMMARY OF THE INVENTION

Briefly summarized, the present invention provides a self-cleaning filter apparatus and method for use in removing particulate matter from a transport fluid, which includes a permeable substrate formed as an endless belt and having a plurality of pleats of filter media extending outwardly from one surface of the substrate, such pleats being arranged on the substrate so that the transport fluid can pass inwardly therethrough and deposit the particulate material on the exterior surface of the pleats. A housing is provided that includes a support frame for supporting the endless belt for movement along a predetermined path that includes at least one straight reach in which the pleats extend outwardly from the substrate in generally spaced parallel relation to one another, and at least one curved reach in which the pleats extend outwardly from the substrate in angular relation to one another such that the spacing between adjacent pleats increases along the outwardly extending direction thereof. At least one drive element is provided for engaging the endless belt to move it along the predetermined path, and a clean air chamber is disposed at the interior portion of the endless belt from which the transport fluid can be removed after it has passed through the pleats and the substrate. A suction nozzle is positioned adjacent the outer surface of the endless belt at the curved reach thereof for removing the particulate matter deposited on the pleats.

In the preferred embodiment of the present invention, the substrate includes imperforate edge portions extending along the side edges thereof, and the support frame includes a pair of support surfaces positioned in spaced relation for supporting the imperforate edge portions of the substrate, and each of the support surfaces is formed with a suction channel extending therealong beneath the substrate edge portions for drawing the substrate edge portions against the support surfaces in sealed relation thereto.

Also, the housing preferably includes a rotating roller having an imperforate cylindrical support surface for supporting the substrate at the curved reach thereof, whereby the suction nozzle, during cleaning, is not working against transport air passing through the filter media at such curved reach. Finally, in the preferred embodiment of the present invention, the suction nozzle extends across the width of the endless belt with one end thereof adapted to be connected to a suction source, and this suction nozzle is formed with a gradually decreasing cross-sectional area along the extending length thereof from such one end thereof so as to generally equalize the suction force imposed on said substrate across the width thereof.

DETAILED DESCRIPTION OF THE PREFERRED EMBODIMENT

Looking now in greater detail at the accompanying drawings, a preferred embodiment of the dust collector or filter apparatus 10 is illustrated, and it includes a housing 12 which supports an upper pulley 14 mounted for rotation on a shaft 16, and a lower drive pulley 18 having a drive shaft 20 which can be connected to any convenient drive source, such as a drive motor 21.

Figure 4:
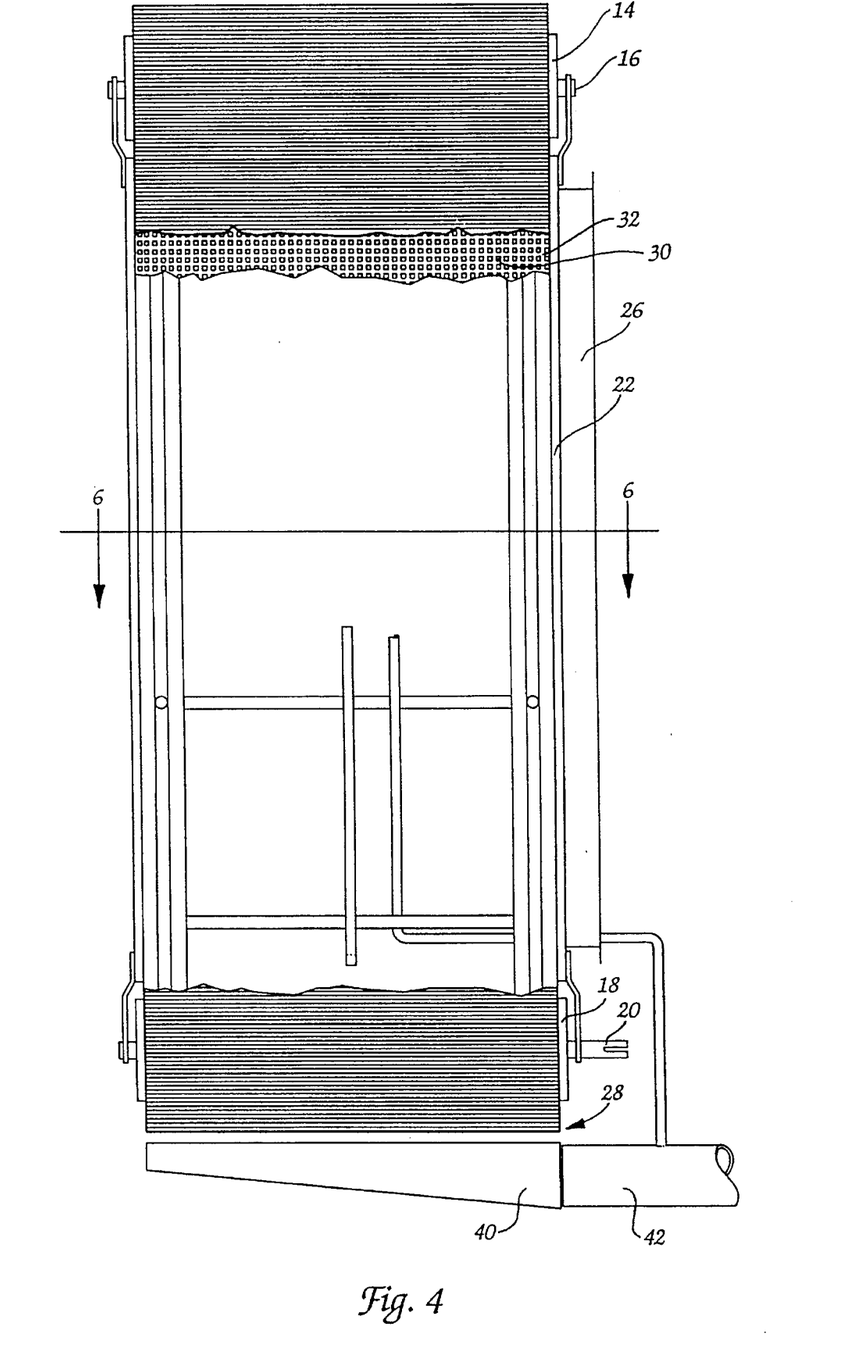
FIG. 4 is a side elevational view of the dust collector illustrated in FIG. 1.
Figure 6:
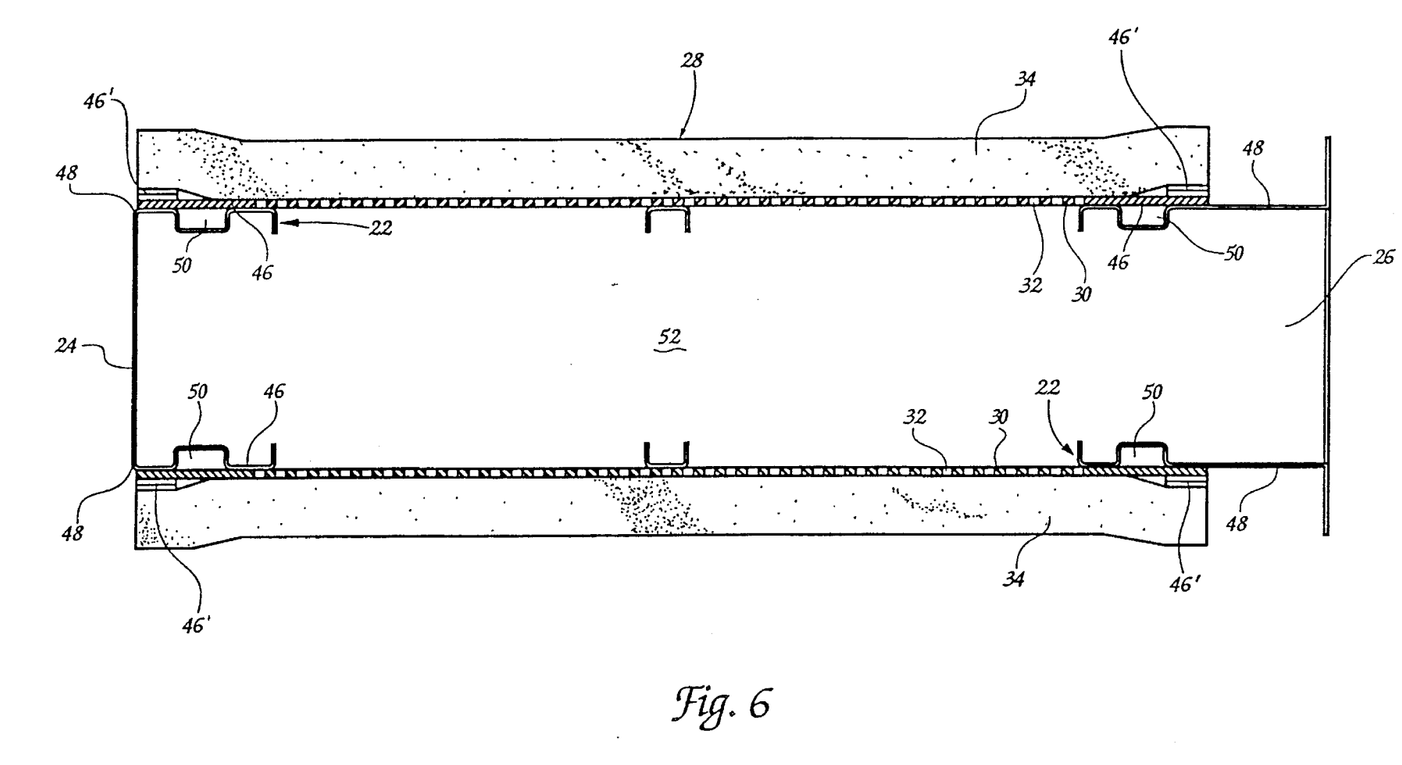
FIG. 6 is a detail view taken along section line 6—6 in FIG. 4.

As best seen in FIGS. 4 and 6, the housing 12 includes an interior frame 22 formed with a closed side wall 24 at one side thereof, and a clean air outlet conduit 26 is formed at the other side portion to permit withdrawal of the clean air, as will be described in greater detail presently.

Figure 3:
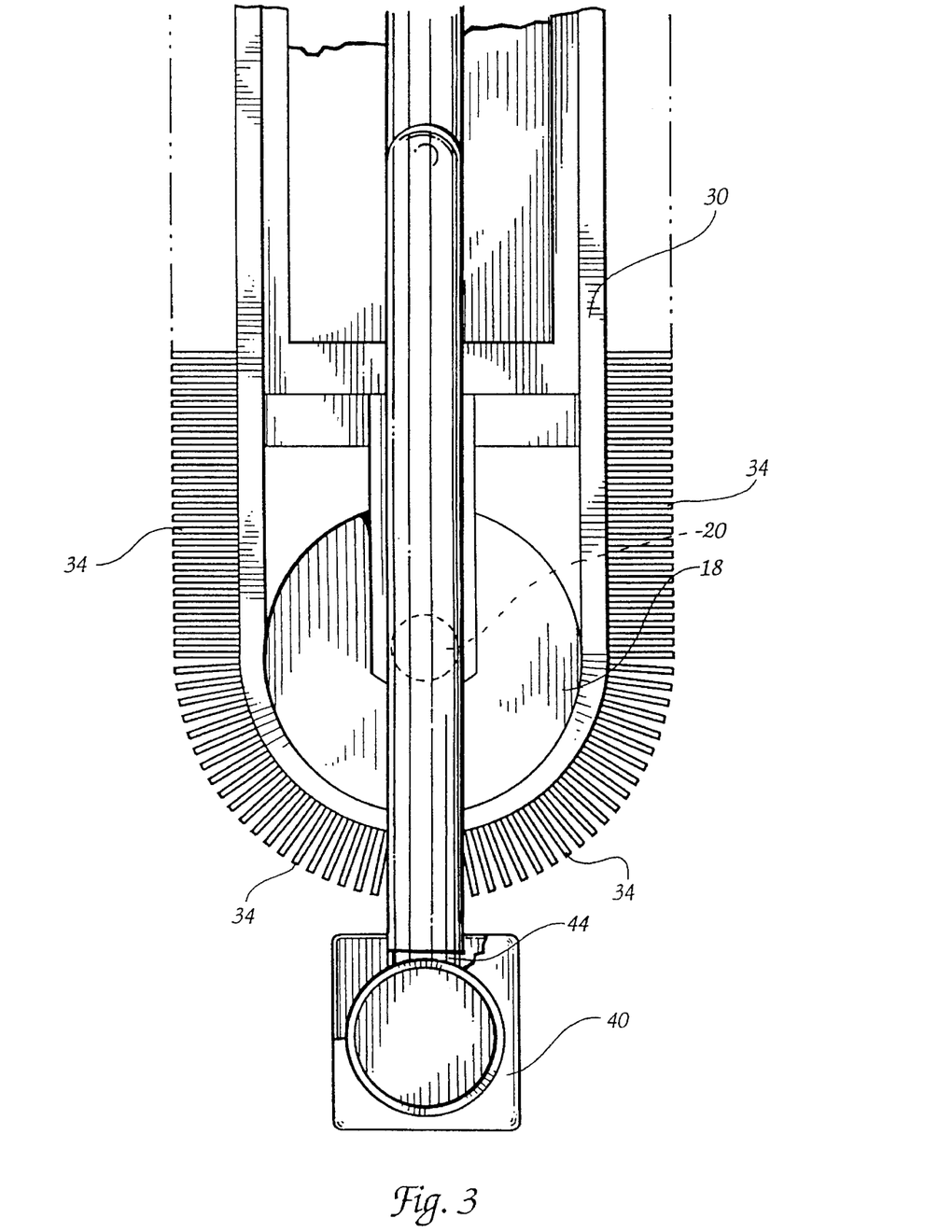
FIG. 3 is a detail view of the bottom portion of the dust collector illustrated in FIG. 2.

A filter element 28 is comprised of a flexible substrate 30 having a plurality of openings 32 extending therethrough and a filter media 34 which is in the form of a plurality of inverted U-shaped pleats 34 that, as best seen in FIG. 3, extend outwardly from the surface of the substrate 30 with a spacing between each pleat 34. The inverted U-shaped pleats 34 are closed along their outwardly extending length, but the interior of each pleat 34 is open at its connection to the substrate 30.

Depending on the particular application of the present invention, the pleats 34 may be formed on the substrate 30 in any satisfactory manner, and in the preferred embodiment of the present invention the filter media 34 has a sinuous configuration that is attached to the substrate in a manner to be described below, a somewhat similar filter media being disclosed in Williams U.S. Pat. No. 5,346,519, which is incorporated herein by reference.

Figure 1:
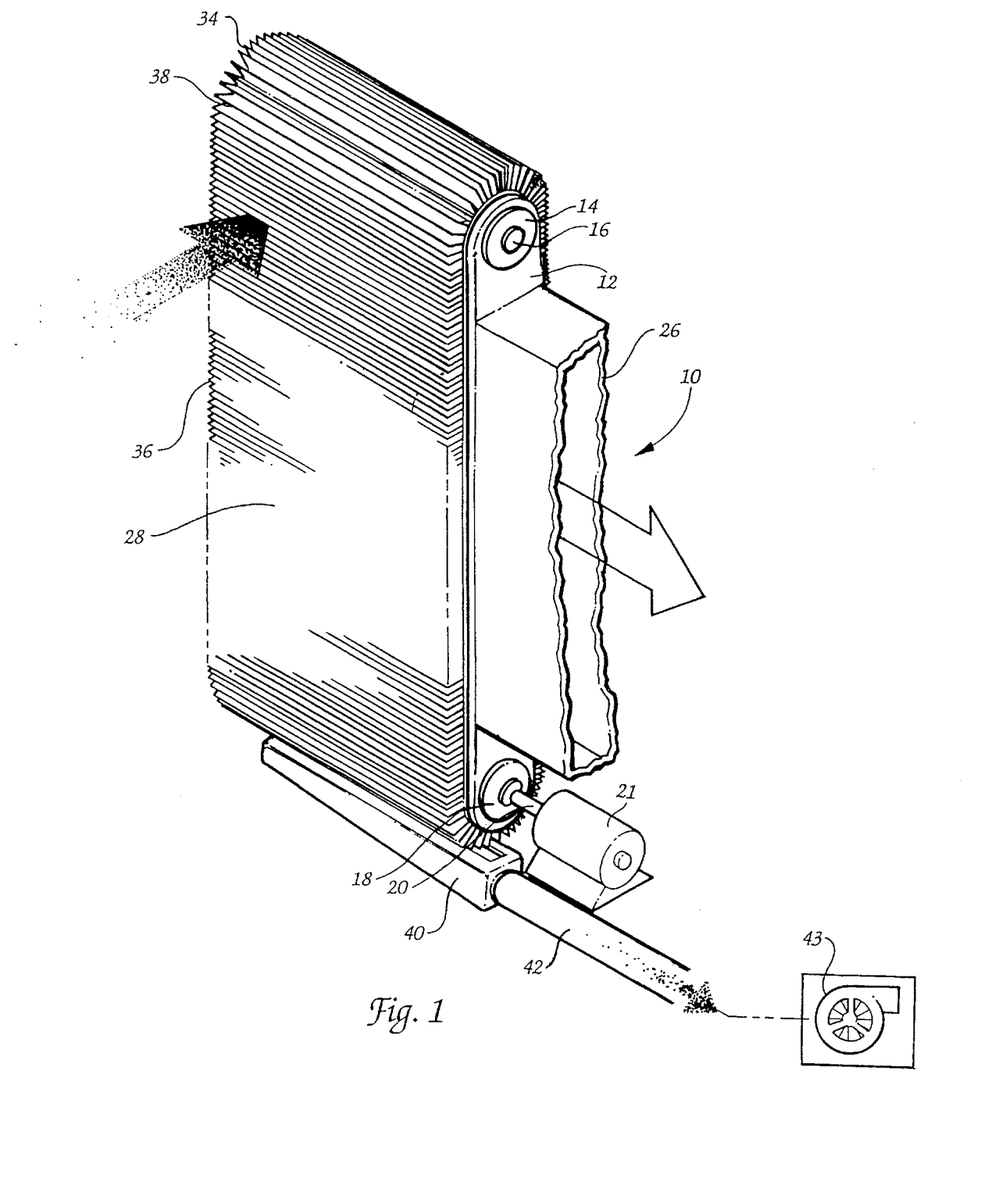
FIG. 1 is a perspective view of a dust collector or filter apparatus embodying the present invention.
Figure 2:
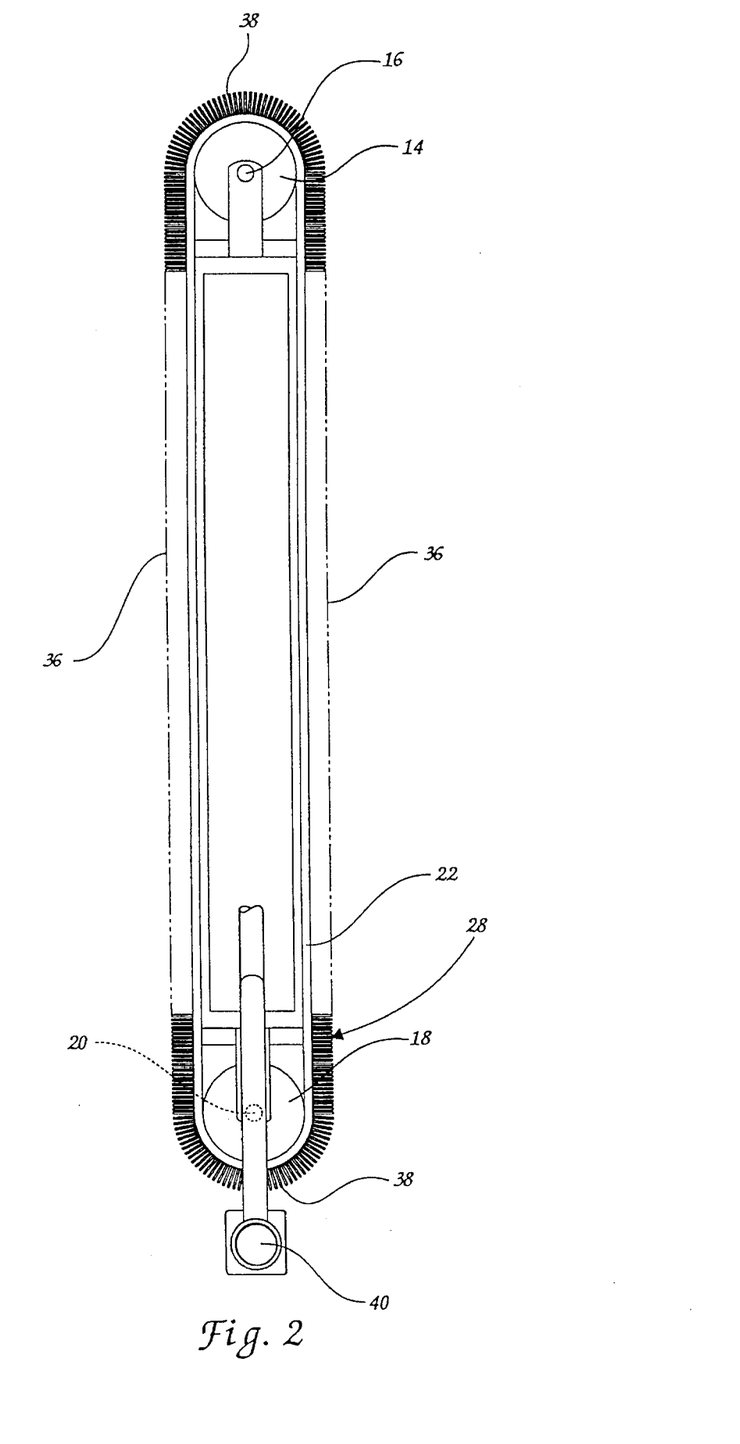
FIG. 2 is an end view of the dust collector illustrated in FIG. 1.

As best seen in FIG. 2, the filter element 28 is an endless belt that is mounted about the upper pulley 14 and the lower drive pulley 18 so as to present two generally parallel straight reaches 36 and two curved reaches 38 at the point where the filter element passes over the pulleys 14, 18. The pleats 34 extend outwardly from the substrate 30 in generally spaced, parallel relation to one another with a slight spacing therebetween, and these pleats 34, at the curved reaches 38, extend outwardly from the substrate in an open angular relation to one another such that the spacing between adjacent pleats 34 increases along the outwardly extending direction thereof.

Figure 5:
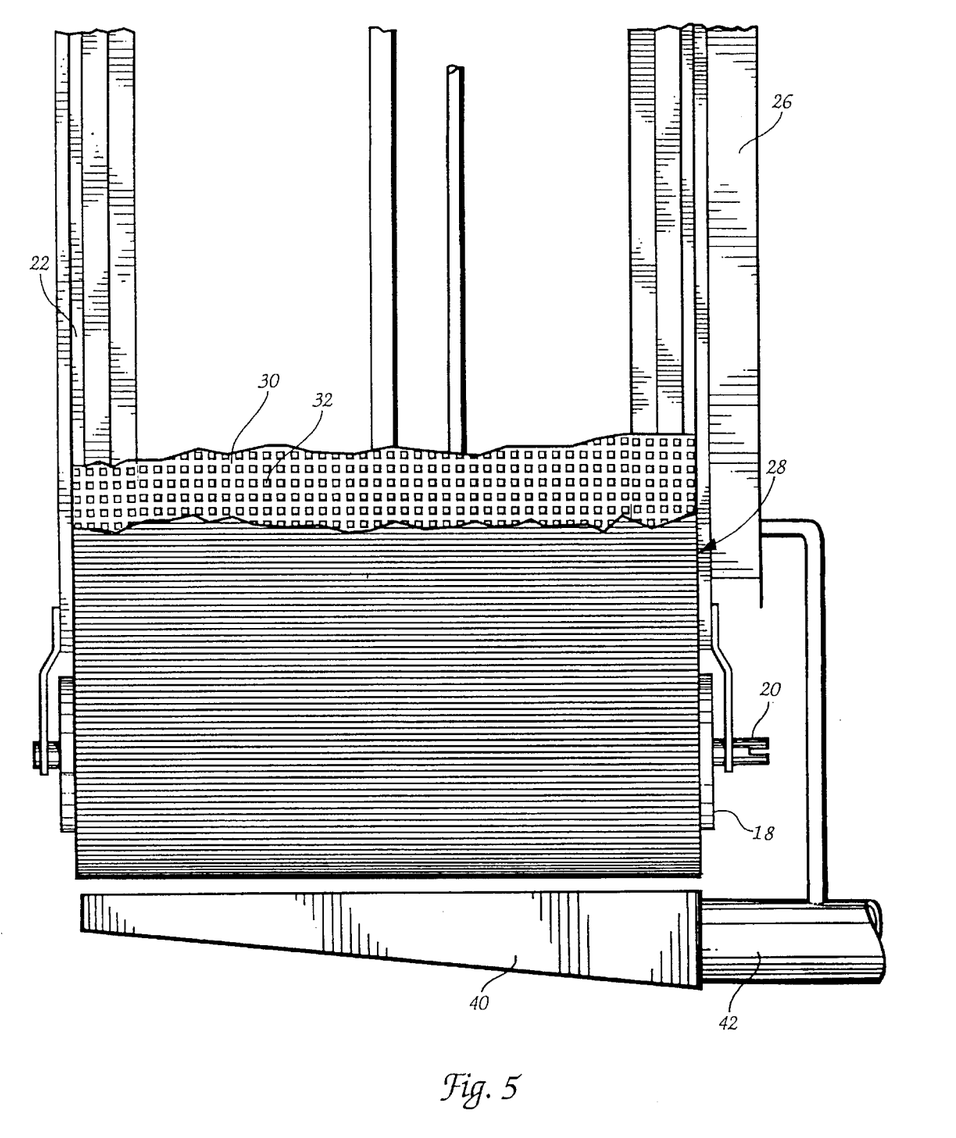
FIG. 5 is a detail view of the bottom portion of the dust collector illustrated in FIG. 4.

The housing 12 is also provided with a suction nozzle 40 which is positioned adjacent the outer surface of the endless filter element 28 at one of the curved reaches 38 thereof, and, as best seen in FIG. 5, the suction nozzle 40 extends across the entire width of the tiller element 28 with one end 42 thereof connected to any convenient source of suction, such as a suction blower 43, and the suction nozzle has a gradually decreasing cross-sectional area along its extending length from the end 42 to generally equalize the suction force imposed on the filter element 28 through a bottom slot 44 (see FIG. 3) of the suction nozzle 40.

Figure 7:
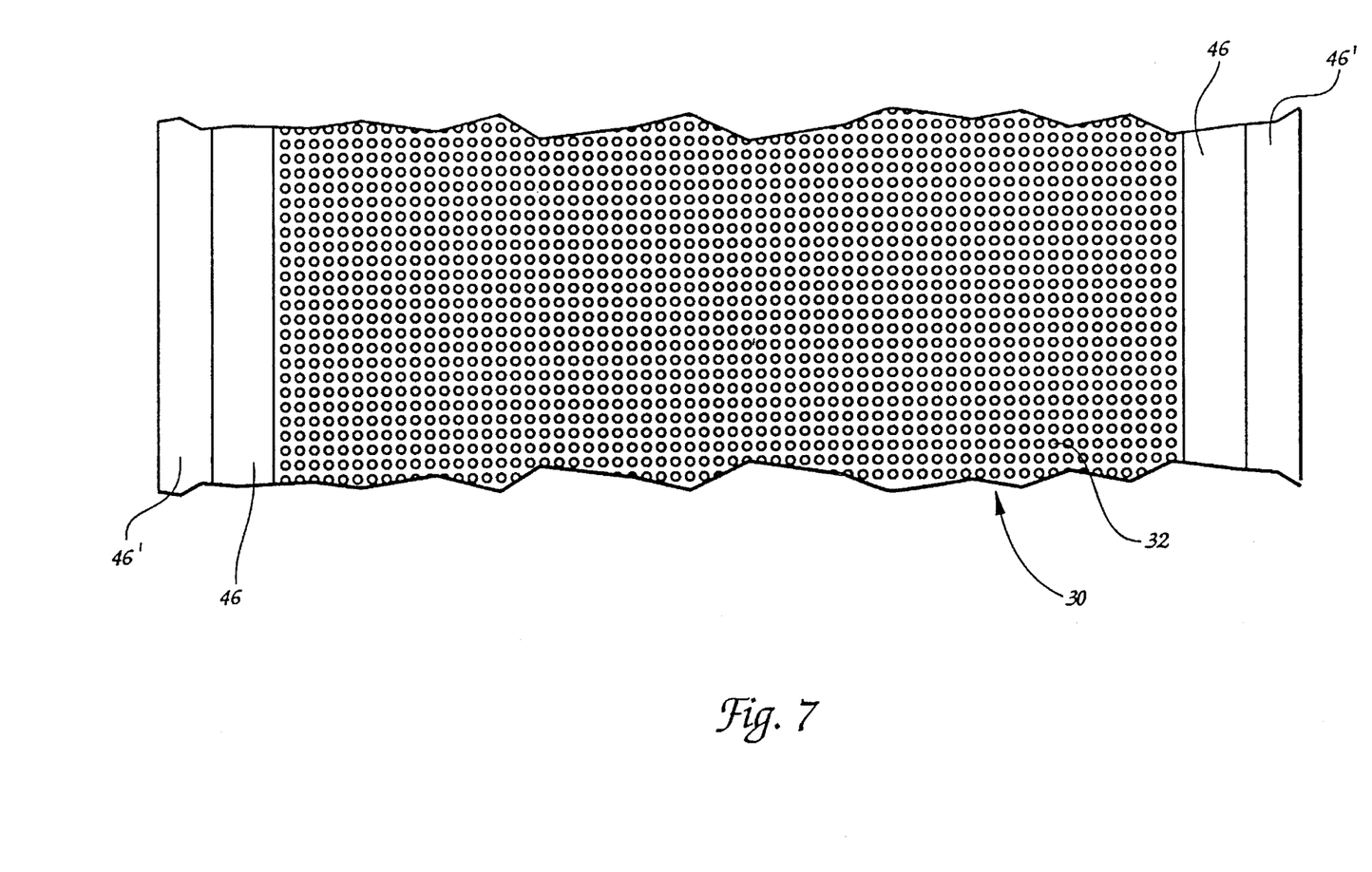
FIG. 7 is a detail plan view of the filter element.

As best seen in FIGS. 6 and 7, the outermost side edges 46 of the substrate 30 are imperforate, and the inner surface of these side edges 46 are arranged to slide along flat support surfaces 48 formed on the frame 22. Also, in the preferred embodiment of the present invention, the upper surface of the outermost portion 46' of the substrate 30 is formed of a Velcro-type loop material to which the filter media 34 can be attached by forming it with a corresponding Velcro-type hook material, whereby the filter media 34, which must be replaced at periodic intervals, can be easily separated from the more expensive substrate 30 and replaced.

As best seen in FIGS. 4 and 6, the flat support surfaces 48 are located on each side of the flame 22, and they extend along the entire vertical height of the dust collector 10, on both sides of the clean air chamber 52, and they have curved portions at the upper and lower ends thereof which are located adjacent the outer edges of the upper pulley 14 and the lower pulley 18 with a radius of curvature corresponding to that of the pulleys 14 and 18, so that the flat support surfaces 48 lie adjacent the outermost side edges of the substrate 30 along its entire generally elliptical extent.

Each of the support surfaces 48 is shaped to include a suction channel 50 that extends along the length thereof beneath the approximate mid-portion of the imperforate side edges 46 of the substrate 30, and these suction channels 50 may be connected to the same suction source connected to the suction nozzle 40, as illustrated in FIG. 4.

In operation, a quantity of transport air having entrained therein dust, lint, or any other foreign matter is introduced to the dust collector 10 at the exterior thereof, and a pressure differential is created across the filter element 28, preferably by a vacuum being imposed on the interior of the housing 12 through the clean air discharge conduit 26. This suction causes the transport air to be drawn through the pleats 34 of the filter element 28 so that foreign matter entrained in the transport air will be deposited on the exterior surfaces of the pleats 34, and the cleaned air will pass through the inverted U-shaped pleats to the interior thereof and through the openings 32 in the substrate 30 so that the cleaned air is collected in a clean air chamber 52 (see FIG. 6) within the housing 12 and can be withdrawn through the clean air discharge conduit 26. The endless filter element 28 is continuously moved through its somewhat elliptical path of movement around the pulleys 14, 18, and the transport air is drawn through filter element 28 at the two straight reaches 36 thereof, and this foreign matter accumulates on the exterior surfaces of the pleats 34 during the movement of the filter element 28 along these straight reaches 36. However, when these pleats 34 reach the lower pulley 18, they proceed through one of the curved reaches 38 and, as best seen in FIG. 3, the spacing between the pleats 34 opens significantly so that the area between adjacent pleats 34, and particularly the bottom area of the spacing adjacent the substrate 30, is significantly more exposed, whereby the suction imposed on the filter element 28 by the closely adjacent suction nozzle 40 can more easily reach and withdraw foreign matter which has collected even on the innermost surfaces of the pleats 34.

Thus, one significant feature of the present invention is that the area of the filter media presented by the pleats 34 is substantially greater than the area that would be presented by a typical or conventional belt filter, such as a felt belt, in which the available filtering surface constitutes only the outer flat surface of the belt, which corresponds generally to the flat outer surface of the substrate 30. More specifically, and looking at FIG. 2, the exposed surface area of each pleat 34 is the area that extends outwardly from the substrate 30 along one of the flat sides of the pleat 34, the small closed end portion of the pleat 34, and the other parallel extending side portion of the pleat 34, and the total area presented to the dirty air is the sum of the surface areas of all of the pleats 34 positioned along each of the two straight reaches 36. Moreover, the ability to clean the foreign matter from the large number of closely spaced pleats 34 is significantly enhanced by the fact that the normally close spacing between adjacent pleats 34 is substantially opened as the pleats 34 pass around the surface of the lower pulley 18, which has a relatively small radius selected to properly open the spacing between adjacent pleats 34, the extent of such opening depending on the particular application of the dust collector 10. In the preferred embodiment of the present invention, the cylindrical support surface of tire lower pulley 18 is solid and imperforate so that the suction at the interior of the housing 12 does not draw dirty transport air inwardly through the filter element 28 while the pleats 34 are being cleaned by the suction nozzle 40, whereby the suction force applied to the exterior surfaces of the pleats 34 by the suction nozzle 40 is not offset by the flow of the transport air in the opposite direction through the pleats 34.

In accordance with another feature of the present invention, a suction force in any desired amount is imposed on the suction channels 50 in the housing 12, and this suction force acts on the imperforate side edges 46 of the substrate 30 to pull the imperforate side edges 46 flush against the flat support surfaces 48 of the frame 22 and thereby seal the clean air chamber 52 and prevent the dirty transport air from passing into the clean air chamber 52 indirectly at the abutment between the moving imperforate side edges 46 and the fixed support surfaces 48. Additionally, it will be noted that, if some dirty transport air should tend to seep inwardly between the outer end of the imperforate side edge and the outer portion of the support surface 48, any such transport air will be drawn into the suction channel 50 and carried away with the suction imposed therein rather than passing all the way into the clean air chamber 52.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A self-cleaning filter apparatus for use in removing particulate matter from a transport fluid, said filter comprising:

(a) a permeable substrate formed as an endless belt and having a plurality of pleats of filter media extending outwardly from one surface of said substrate, said pleats being arranged on said substrate so that said fluid can pass inwardly therethrough and deposit said particulate material on the exterior surface of said pleats;

(b) a housing that includes:
      (i) a support frame for supporting said endless belt for movement along a predetermined path that includes at least one straight reach in which said pleats extend outwardly from said substrate in generally spaced parallel relation to one another, and at least one curved reach in which said pleats extend outwardly from said substrate in angular relation to one another such that the spacing between adjacent pleats increases along the outwardly extending direction thereof;
      (ii) at least one drive element engaging said endless belt to move it along said predetermined path;
      (iii) a clean fluid chamber disposed at the interior portion of said endless belt from which said transport fluid can be removed after it has passed through said pleats; and (c) a suction nozzle positioned adjacent the outer surface of said endless belt at said curved reach thereof for removing said particulate matter deposited on said pleats.

2. A self-cleaning filter as defined in claim 1, wherein said substrate includes imperforate edge portions extending along the side edges thereof, and wherein said support frame includes a pair of support surfaces positioned in spaced relation for supporting said imperforate edge portions of said substrate, and each of said support surfaces being formed with a suction channel extending therealong beneath said substrate edge portions for drawing said substrate edge portions against said support surfaces to form a seal therebetween and for carrying away any foreign matter that may pass through such seal before such foreign matter reaches said clean fluid chamber.

3. A self-cleaning filter as defined in claim 2, wherein said pair of support surfaces extend along and adjacent to the entire length of the straight and curved reaches of said substrate.

4. A self-cleaning filter as defined in claim 2, wherein said suction channels and said suction nozzle are connected to the same suction source.

5. A self-cleaning filter as defined in claim 1, wherein said housing includes an imperforate surface for supporting said substrate at said curved reach thereof.

6. A self-cleaning filter as defined in claim 1, wherein said housing includes a rotating roller having an imperforate cylindrical support surface for supporting said substrate at said curved reach thereof.

7. A self-cleaning filter as defined in claim 1, wherein said suction nozzle extends across the width of said endless belt with one end thereof adapted to be connected to a suction source, said suction nozzle having a gradually decreasing cross-sectional area along the extending length thereof from said one end thereof so as to generally equalize the suction force imposed on said substrate across the width thereof.

8. A self-cleaning filter apparatus for use in removing particulate matter from a transport fluid, said filter comprising:

(a) a substrate formed as an endless belt with a permeable center portion and opposed imperforate side edge portions, and said substrate having a plurality of generally U-shaped pleats of filter media extending outwardly from the outermost surface of said substrate, said pleats being arranged on said substrate so that the closed ends thereof are spaced from said substrate and with side portions extending generally perpendicularly outwardly from said substrate in spaced relation to one another so that said transport fluid can pass inwardly therethrough and deposit said particulate material on the exterior surface of said pleats; and (b) a housing that includes:
      (i) a pair of rollers spaced apart and supporting the interior surface of said substrate thereon so that it extends along a predetermined path that includes two generally curved reaches extending about the surfaces of said rollers and two generally parallel straight reaches extending between said rollers, at least one of said rollers being formed with an imperforate surface for supporting said substrate;
      (ii) drive means connected to one of said rollers for rotating said one roller and moving said substrate along said predetermined path;
      (iii) a pair of generally flat support surfaces extending in spaced parallel relation between said rollers at a position to support, respectively, said imperforate side edge portions of said endless belt, each said support surface being formed with a channel extending along the length thereof beneath said imperforate side edge portions of said substrate whereby said channels can be connected to a source of suction to draw said side edge portions of said moving substrate against said support surfaces in sealing relation therewith;

(iv) a clean fluid chamber disposed at the interior portion of said endless belt from which said transport fluid can be removed after it has passed through said pleats and said substrate; and (v) a suction nozzle extending across the width of said substrate adjacent the curved reach of said substrate at said imperforate roller for removing said particulate matter deposited on the exterior surface of said pleats.

9. A method of filtering particulate matter from a transport fluid, said method comprising the steps of:

(a) providing an endless perforate substrate with a plurality of pleats of filter media that extend outwardly from the outer surface thereof and that have surfaces extending in spaced relation to one another;

(b) moving said endless substrate along a predetermined path that includes at least one generally straight reach at which said pleats extend in generally parallel relation to one another and at least one curved reach at which said pleats are disposed in angular relation to one another so that the spacing therebetween increases in the outwardly extending direction thereof;

(c) causing the transport fluid to flow inwardly through said pleats and said substrate to deposit said particulate matter on the exterior surface of said pleats and thereby clean the transport fluid; and (d) creating a suction at said curved reach of said endless substrate to remove said particulate matter from the exterior surfaces of said pleats while they are disposed in said angular relation to one another.

10. A method as defined in claim 9, wherein that portion of said endless substrate which is moving through said curved reach beneath said suction is supported on an imperforate surface whereby said suction is unopposed by the flow of the transport fluid.

11. A method as defined in claim 9, and including the steps of forming the side edge portions of said substrate of imperforate material, and moving said side portions along support surfaces at said straight reach while applying a suction force at said side edge portions to draw them against said support surfaces and thereby seal said substrate thereat.

12. A method as defined in claim 11, and including the step of applying said suction force to said side edge portions along the entire length of said endless substrate.

13. A method as defined in claim 11, and including the step of utilizing a single source of suction for creating said suction at said curved reach of said endless substrate and for applying said suction force at said side edge portions of said endless substrate.

14. A method of filtering particulate matter from a transport fluid, said method comprising the steps of:

(a) providing an endless perforate substrate with a plurality of pleats of filter media that extend outwardly from the outer surface thereof and that have surfaces extending in spaced relation to one another;

(b) moving said endless substrate along a predetermined path that includes at least one generally straight reach at which said pleats extend outwardly from said substrate with a relatively small normal spacing between each two adjacent pleats and at least one curved reach at which said normal spacing between each two adjacent pleats is increased;

(c) causing the transport fluid to flow inwardly through said pleats and said substrate to deposit said particulate matter on the exterior surface of said pleats and thereby clean said transport air; and (d) creating a suction at said curved reach of said endless substrate to remove said particulate matter from the exterior surfaces of said pleats while they are disposed within said increased spacing therebetween.

\* \* \* \* \*